United States Patent
Guthrie

(10) Patent No.: US 12,114,603 B1
(45) Date of Patent: Oct. 15, 2024

(54) TERRAIN-ADAPTIVE BRUSH CUTTER WITH DUAL TRANSMISSION AND TELESCOPING LIMB CUTTER

(71) Applicant: Robert M. Guthrie, Phil Campbell, AL (US)

(72) Inventor: Robert M. Guthrie, Phil Campbell, AL (US)

(*) Notice: Subject to any disclaimer, the term of this patent is extended or adjusted under 35 U.S.C. 154(b) by 0 days.

(21) Appl. No.: 18/744,890

(22) Filed: Jun. 17, 2024

(51) Int. Cl.
  *A01D 43/00* (2006.01)
  *A01G 3/08* (2006.01)
  *A01G 23/09* (2006.01)
  *A01G 23/095* (2006.01)

(52) U.S. Cl.
  CPC .............. *A01D 43/00* (2013.01); *A01G 3/085* (2013.01); *A01G 23/095* (2013.01)

(58) Field of Classification Search
  CPC ....... A01G 3/085; A01G 23/095; A01D 41/14
  See application file for complete search history.

(56) References Cited

U.S. PATENT DOCUMENTS

| | | | | |
|---|---|---|---|---|
| 3,473,302 | A * | 10/1969 | Caldwell | A01D 34/661 56/6 |
| 4,802,327 | A * | 2/1989 | Roberts | A01D 34/863 83/831 |
| 4,996,830 | A * | 3/1991 | Davison | A01D 34/866 56/14.7 |
| 6,308,503 | B1 * | 10/2001 | Scag | A01D 34/685 56/16.9 |
| D990,524 | S * | 6/2023 | Denton | D15/27 |
| 12,041,875 | B2 * | 7/2024 | Bagwan | A01D 75/306 |
| 2012/0275889 | A1 * | 11/2012 | Hoppel | B65G 15/30 414/528 |
| 2015/0082762 | A1 * | 3/2015 | Silcock | A01G 23/095 56/235 |
| 2016/0106020 | A1 * | 4/2016 | Akahane | A01D 34/66 56/17.1 |
| 2022/0087099 | A1 * | 3/2022 | Hoffman | A01D 34/286 |

* cited by examiner

*Primary Examiner* — Abigail A Risic
(74) *Attorney, Agent, or Firm* — George P. Kobler

(57) ABSTRACT

A heavy duty brush cutter includes a chassis, an engine, left and right cutting decks with rotating mower blades, transmissions, and a gear box. The cutter features telescoping drive shafts, hydraulic actuators for deck adjustment, a forward frame with axles for wheels or tracks, and steering arms for directional control. Additional configurations may include a telescoping tree limb cutter with a rotatable boom, counter-weights for balance, wheels or tracks on various axles, and a central rotating blade. The system is designed for robust vegetation management with various attachments for enhanced functionality.

15 Claims, 5 Drawing Sheets

TERRAIN-ADAPTIVE BRUSH CUTTER WITH DUAL TRANSMISSION AND TELESCOPING LIMB CUTTER

BACKGROUND

Field

The present disclosure relates generally to cutting machines, and in particular, to heavy duty brush cutting machines.

Description of the Problem

Traditional brush cutting equipment often struggles with demanding vegetation management tasks due to limitations in power, durability, and efficiency.

SUMMARY

For purposes of summary, certain aspects, advantages, and novel features are described herein. It is to be understood that not necessarily all such advantages may be achieved in accordance with any one particular embodiment. Thus, the apparatuses or methods claimed may be embodied or carried out in a manner that achieves or optimizes one advantage or group of advantages as taught herein without necessarily achieving other advantages as may be taught or suggested herein.

In accordance with embodiments, a heavy duty brush cutter is provided comprising a chassis; an engine supported by the chassis; left and right cutting decks pivotally attached to the chassis sides, each housing rotating mower blades; a first transmission driven by the engine; a gear box driven by the first transmission to rotate the mower blades within the cutting decks; left and right telescoping drive shafts driven by the gear box and coupled to the mower blades; hydraulic actuators to raise and lower the cutting decks; a forward frame with axles for wheels or tracks, and hydraulic actuators for height adjustment; steering arms for directional control; a second transmission for the engine; a rearward frame with a rear axle for wheels or tracks; a rear drive shaft driven by the second transmission to rotate the rear axle; and hydraulic actuators for raising and lowering the rearward frame.

In one embodiment, the heavy duty brush cutter may include a telescoping tree limb cutter comprising a cutting head supported a telescoping boom, the telescoping boom having a base end mounted to the chassis and configured to be rotatable in the horizontal plane from a parallel position to a perpendicular position with respect to the chassis and raised and lowered.

BRIEF DESCRIPTION OF THE DRAWINGS

The apparatus is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1:
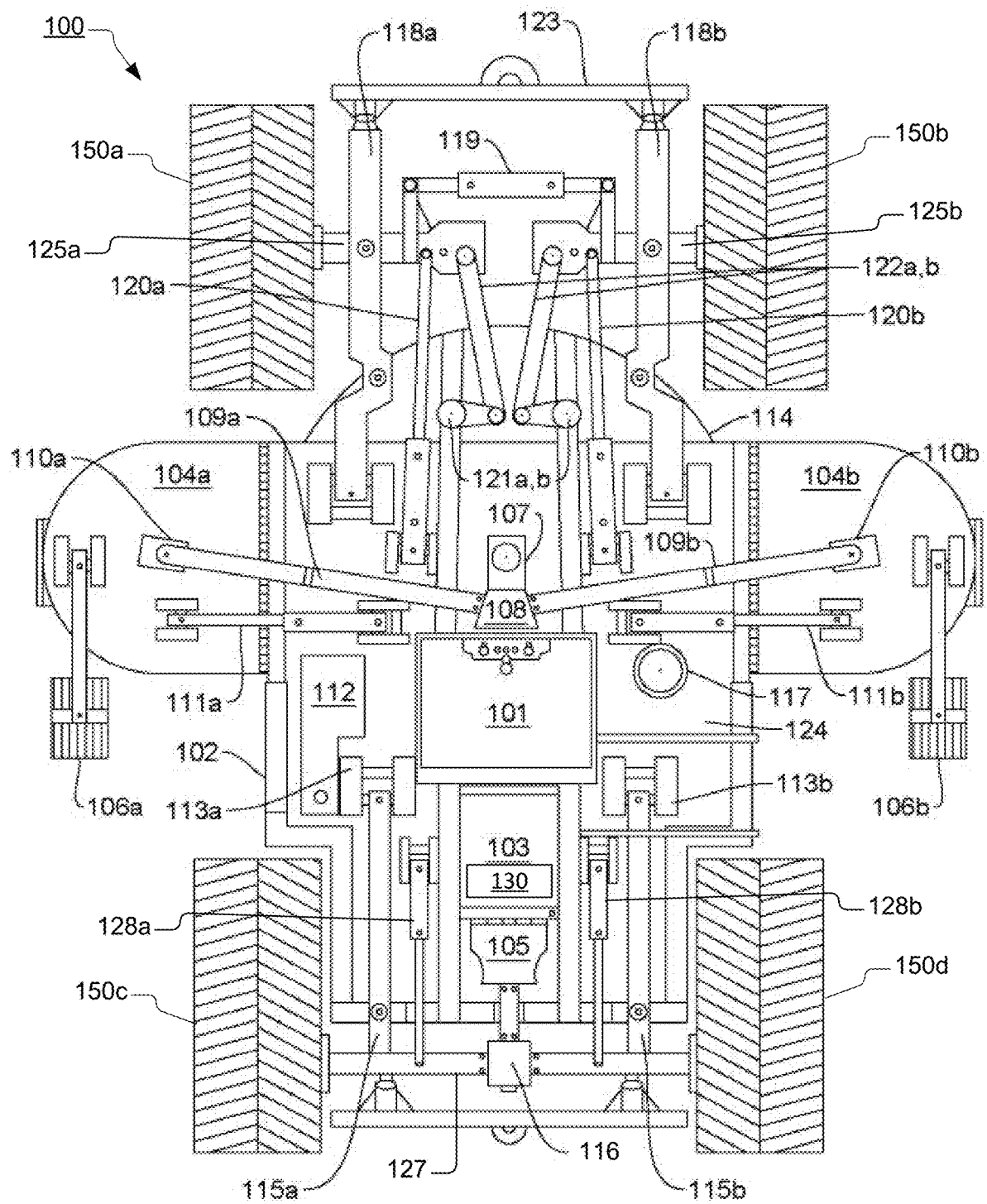
FIG. 1 is a plan illustration of a first embodiment of a heavy duty brush cutting apparatus.

The various embodiments of a remote-controlled cutting apparatus and their advantages are best understood by referring to FIGS. 1 through 5 of the drawings. The elements of the drawings are not necessarily to scale, emphasis instead being placed upon clearly illustrating the novel features and principles of operation. Throughout the drawings, like numerals are used for like and corresponding parts of the various drawings.

Furthermore, reference in the specification to "an embodiment," "one embodiment," "various embodiments," or any variant thereof means that a particular feature or aspect described in conjunction with the particular embodiment is included in at least one embodiment. Thus, the appearance of the phrases "in one embodiment," "in another embodiment," or variations thereof in various places throughout the specification are not necessarily all referring to its respective embodiment.

With reference to the figures, the heavy-duty brush cutter system, identified as system/component number 100, is a comprehensive apparatus designed for robust vegetation management tasks. System 100 encompasses a variety of components and sub-components, each playing a role in its operation. The chassis 114 serves as the foundational structure for the heavy-duty brush cutter 100. It is the central framework to which other components are attached, providing a structural foundation. The chassis comprises a deck made from ¾" steel and supports an engine 103, which drives a first transmission 108. The engine 103 is preferably rated at 255 Hp. The engine drives the first transmission, which is a part of the brush cutter's mechanical system. The first transmission 108 is connected to a forward gearbox 107 that imparts rotation to left and right mower blades (FIG. 5: 501a, b) within the cutting decks 104a, b. The forward gearbox 107 may also be configured to drive rotation of a central blade 503. For the left and right mower blades 501a, b, rotation is transmitted through left and right telescoping drive shafts 109a, b that extend laterally outward to the left and right mower blades 501a, b respectively. The central blade may be about 7' in diameter while the left and right mower blades 501a, b may be about 4' to about 5' in diameter. The left and right telescoping drive shafts 109a, b transmit rotation to the left and right mower blades 501a, b, allowing for the extension and retraction to accommodate the width of the cutting area.

Pivotally connected to the left and right sides of the chassis 114 are left and right cutting decks 104a, b, each housing rotating left and right mower blades 501a, b. These decks can be raised and lowered by left and right hydraulic actuators 111a, b. The left and right cutting decks 104a, b house left and right rotating mower blades 501a, b and are pivotally connected to the chassis for cutting operations. The left and right hydraulic actuators 111a, b adjust the height of the cutting decks for various cutting needs and can raise the cutting decks 104a, b from a horizontal position to a vertical position. Additionally, the brush cutter 100 can have left and right outrigger wheels 106a, b pivotally attached to the respective cutting decks 104a, b, allowing them to follow the contour of the ground. For mobility, the brush cutter 100 features a pair of forward frame members 118a, b pivotally attached to the front end of the chassis 114, supporting left and right axles 125a, b. These axles can be fitted with either wheels or tracks, and their elevation can be adjusted by left and right forward hydraulic actuators 120*a*, *b*. The forward frame 118*a*, *b* provides mobility to the brush cutter by supporting the left and right axles 125*a*, *b* and being pivotally attached to the chassis 114. Directional control is provided by left and right steering arms 122*a*, *b*, which are part of a hydraulically driven power steering system 121*a*, *b* and are coupled to the axles 125*a*, *b*. The left and right steering arms 122*a*, *b* and the power steering system 121*a*, *b* provide directional control to the brush cutter 100 by being coupled to the axles 125*a*, *b*.

At the rear, a second transmission 105, also driven by the engine 103, powers a rearward frame 115*a*, *b* that is pivotally attached to the rear end of the chassis 114. This rearward frame 115*a*, *b* supports a rear axle 127, which can also be fitted with either wheels or tracks 150*c*, *d*, contributing to the brush cutter's mobility. A rear drive shaft, driven by the second transmission, connects to a second gearbox 116 that imparts rotation to the rear axle 127. The rear drive shaft transmits power from the second transmission 105 to the second gearbox 116, which then imparts rotation to the rear axle 127 for propulsion. The rearward frame's elevation is controlled by left and right hydraulic actuators 128*a*, *b*.

To power all hydraulic actuators, the brush cutter is equipped with a hydraulic pump 130, driven by the engine 103, and configured with connections to a hydraulic reservoir (not shown) for containing enough fluid for the hydraulic system.

The forward frame actuators 120*a*, *b* and rearward frame actuators 128*a*, *b* are configured to raise and lower the chassis 114, and, thus, the cutting blade 503. In a preferred embodiment, the blade height ranges from 4" to 12". The rugged brush-cutting system is designed to cutting softwood trees up to about 4" to 5" in diameter.

Figure 2:
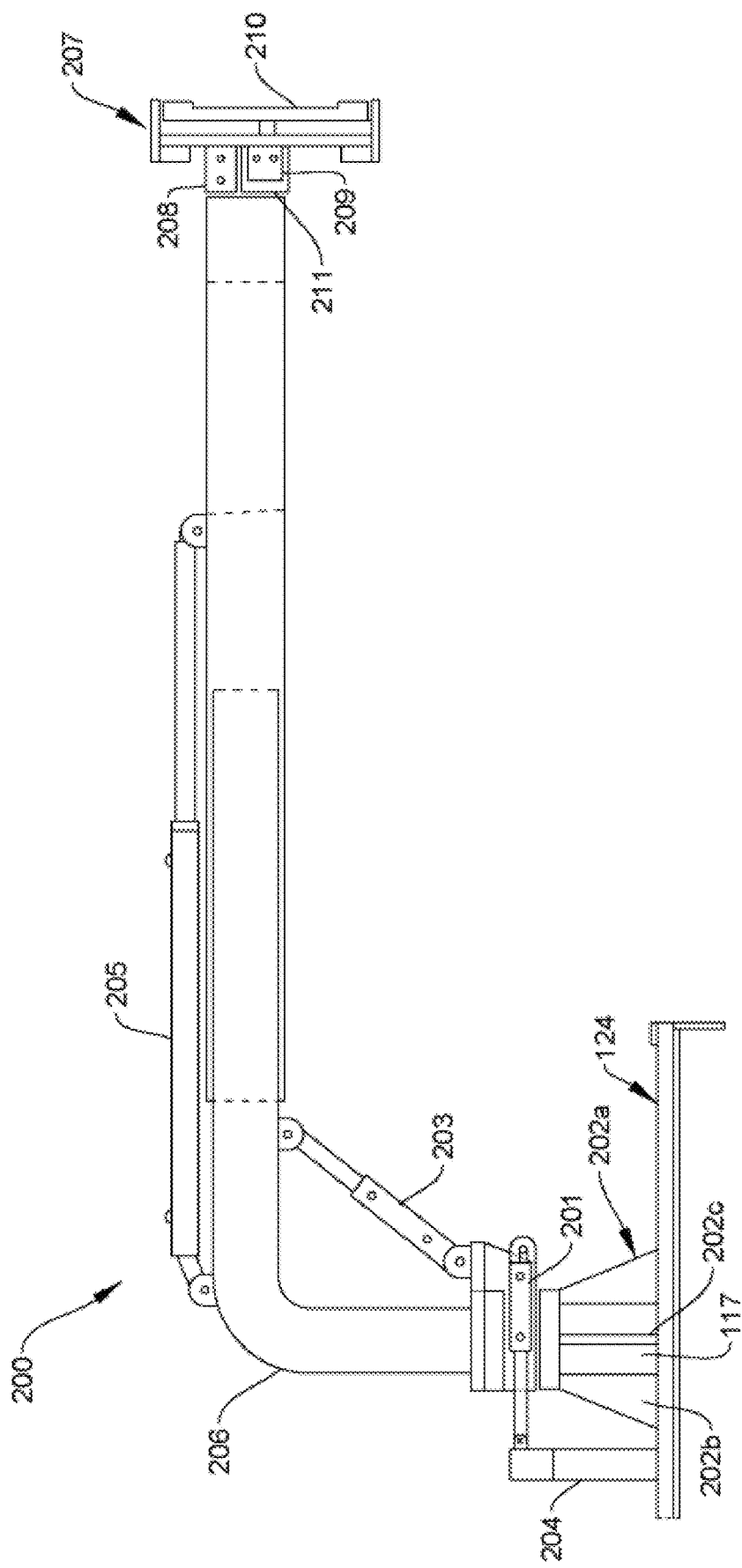
FIG. 2 depicts a boom and tree limb cutter head for the brush cutting apparatus of FIG. 1.

The brush cutter 100 can be further equipped with a telescoping tree limb cutter, depicted with reference to FIG. 2, which includes a cutting head 207 supported by the outward end of a telescoping boom 200. The boom's base end 117 is mounted to the chassis 114 on a mounting plate 124 and can rotate horizontally from a parallel to a perpendicular position relative to the chassis 114. In order to support deployment of the boom 200, the mounting plate is preferably comprised of a thick steel plate, and may be one inch or more in thickness. The boom 200 can also be raised and lowered. The telescoping tree limb cutter provides the brush cutter 100 with the capability to cut tree limbs, enhancing its versatility in vegetation management. To balance the weight distribution when the telescoping boom 200 is extended, a counter-weight 102 is supported by the chassis 114 on the side opposite to where the boom 200 is mounted. The counter-weight 102 balances the weight distribution of the brush cutter 100 when the telescoping boom 200 is extended, ensuring stability. In some embodiments, a central rotating blade 210, driven by a gearbox 209, is included to provide additional cutting capability. The central rotating blade 210 provides additional cutting capability, enhancing the brush cutter's effectiveness in vegetation management. The system 100 is designed to offer versatility and efficiency in brush cutting operations, with the ability to adapt to various terrains and vegetation types through its multiple configurations and attachments.

Figure 3:
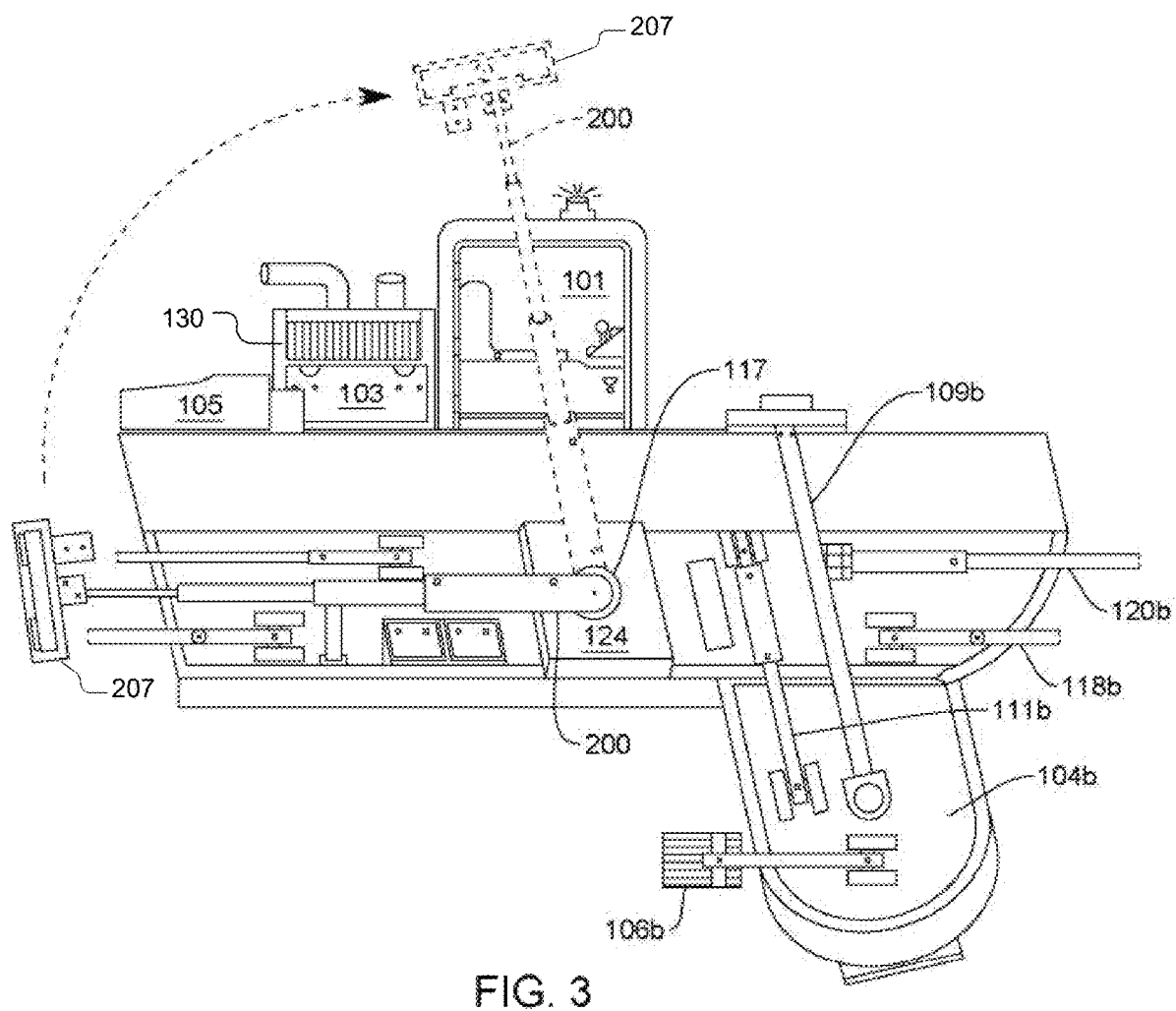
FIG. 3 illustrates the boom of FIG. 2 in a first, stowed position and in a deployed position.

As shown in FIG. 2, boom 200 is mounted to plate 124 by its base 117 and may comprise an L-shaped member 206 transitioning from vertical orientation near the base 117 to horizontal orientation. The base 117 may be configured with a plurality of structural gussets 202*a*-*c* for added support. In one embodiment, rotation in the horizontal plane is achieved with a horizontal hydraulic actuator 201 having one end pivotally attached to base 117 and an outer end attached to a stanchion 204. The boom 200 further comprises an elevational control hydraulic actuator 203 for raising and lowering the boom 200. This actuator 203 has an upper end attached to the horizontal portion of the boom 200 and a lower end attached to the base portion 117. The boom 200 comprises two or more telescoping members that allow the boom 200 to extend in length. Extension and retraction of the telescoping members is achieved with an extension control hydraulic actuator 205. Mounted to the distal end of the boom 200 is a tree limb cutting head 207 which comprises a rotating cutting blade 210 driven by a gearbox 209. The cutting head 207 also comprises a hydraulic pump 208 for pumping hydraulic fluid from the system to a hydraulic motor 211 which drives the blade 210. FIG. 3 illustrates deployment of the boom 200 and cutting head 207 from a horizontal, stowed position to a deployed vertical position (shown in dashed lines).

Figure 4:
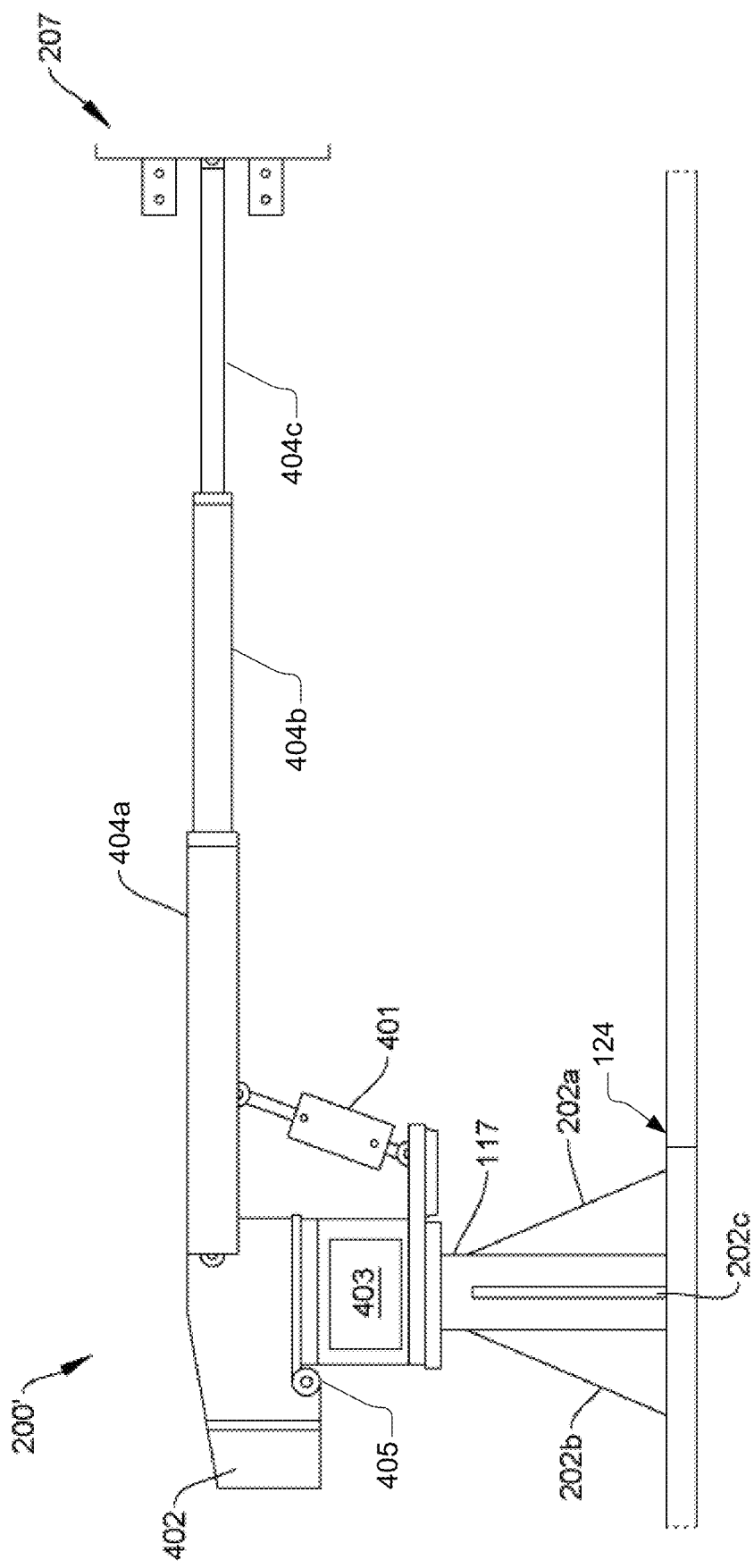
FIG. 4 shows a second exemplary embodiment of a boom for a tree limb cutter.
Figure 5:
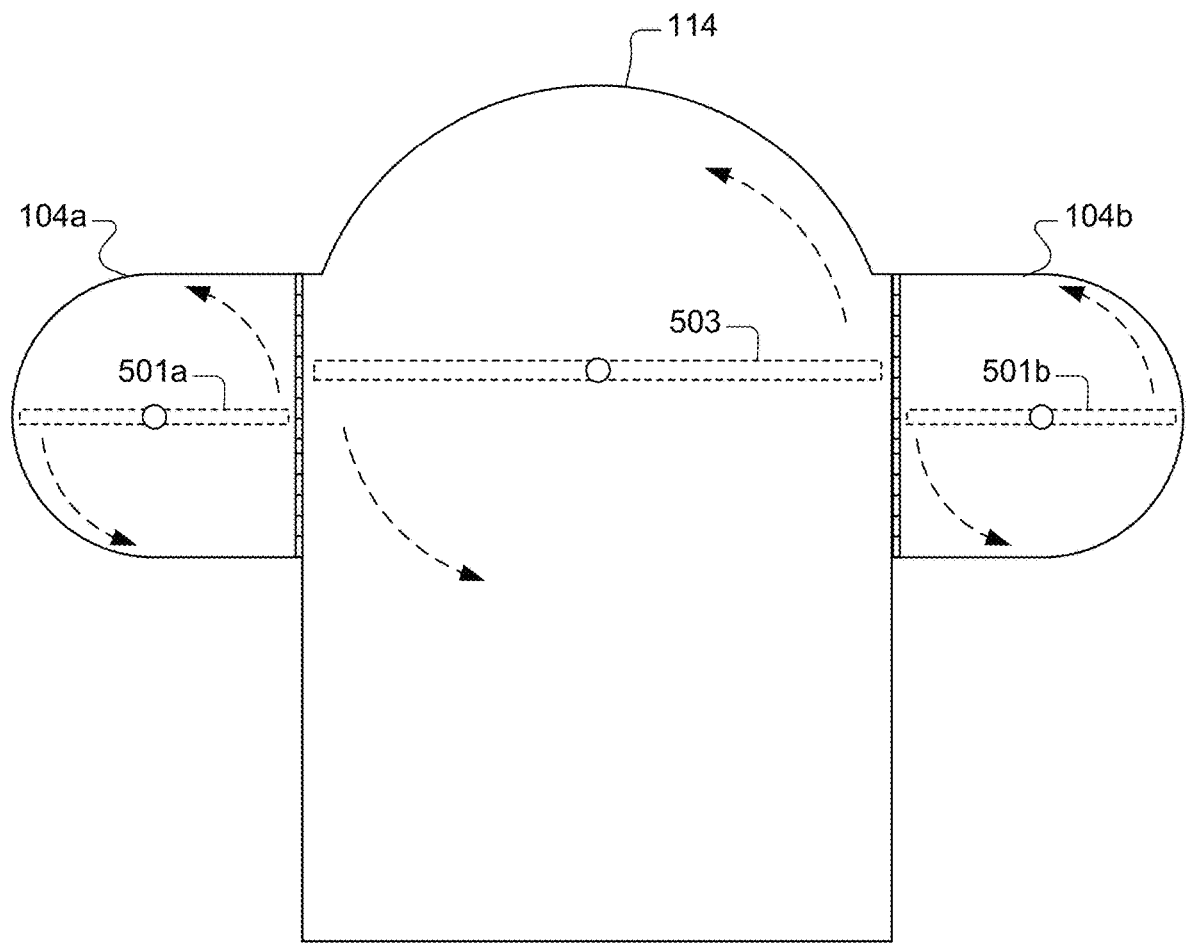
FIG. 5 shows mower blades housed by the chassis.

FIG. 4 shows a further embodiment of the boom 200' having a base portion 117 mounted to mounting plate 124 with structural gussets 202*a*-*c*. The boom 200' is pivotally mounted on a pedestal 403 by a hinge point 405. An elevational control actuator 401 comprises an upper end pivotally attached to a first boom member 404*a* and a lower end pivotally attached to a plate supporting the pedestal 403. The first boom member 404*a* extends from a counter-weight 402. Boom members 404*b*, *c* are nested within the first boom member 404*a*, all of which are hollow and house a hydraulic actuating system (not shown) for extending and retracting the boom 200'.

As described above and shown in the associated drawings, the present invention comprises a terrain-adaptive brush cutter with dual transmission and telescoping limb cutter. While particular embodiments have been described, it will be understood, however, that any invention appertaining to the apparatus/system/method described is not limited thereto, since modifications may be made by those skilled in the art, particularly in light of the foregoing teachings. It is, therefore, contemplated by the appended claims to cover any such modifications that incorporate those features or those improvements that embody the spirit and scope of the invention.

What is claimed is:

1. A heavy duty brush cutter comprising:
   a chassis;
   an engine supported by the chassis;
   left and right cutting decks pivotally attached to the left and right sides of the chassis, each of the cutting decks housing respective rotating mower blades;
   a first transmission supported by the chassis and driven by the engine;
   a gear box driven by the first transmission, the gear box configured to impart rotation to at least two mower blades that are enclosed within respective left and right cutting decks;
   left and right telescoping drive shafts driven by the first transmission via the gear box having laterally outward ends coupled to the respective rotating mower blades;
   left and right hydraulic actuators configured to raise and lower the left and right cutting decks;
   a forward frame pivotally attached to the front end of the chassis, the forward frame supporting left and right axles upon which are mounted one of wheels and tracks;
   left and right forward hydraulic actuators configured to raise and lower the forward frame;

left and right steering arms driven by a power steering system and having forward ends coupled to the left and right axles for imparting directional control;

a second transmission supported by the chassis and driven by the engine;

a rearward frame pivotally attached to the rear end of the chassis, the rearward frame supporting a rear axle upon which are mounted one of wheels and tracks;

a rear drive shaft driven by the second transmission the rear drive shaft coupled to second gear box configured to impart rotation to the rear axle; and left and right rearward hydraulic actuators for raising and lowering the rearward frame; and wherein the chassis may be raised and lowered with respect to ground level.

2. The heavy duty brush cutter of claim 1, further comprising a telescoping tree limb cutter comprising:

a cutting head supported by an outward end of a telescoping boom, the telescoping boom having a base end mounted to the chassis and configured to be rotatable in the horizontal plane from a parallel position to a perpendicular position with respect to the chassis, wherein the telescoping boom is configured to be raised and lowered.

3. The heavy duty brush cutter of claim 2, further comprising a counter-weight supported by the chassis on the opposite side of the chassis from where the base end is mounted.

4. The heavy duty brush cutter of claim 1, further comprising left and right wheels pivotally attached to respective left and right cutting decks.

5. The heavy duty brush cutter of claim 1, further comprising tracks mounted to the rear axle and driven by the rear drive shaft.

6. The heavy duty brush cutter of claim 5, further comprising a telescoping tree limb cutter comprising:

a cutting head supported by an outward end of a telescoping boom, the telescoping boom having a base end mounted to the chassis and configured to be rotatable in the horizontal plane from a parallel position to a perpendicular position with respect to the chassis, wherein the telescoping boom is configured to be raised and lowered.

7. The heavy duty brush cutter of claim 6, further comprising a counter-weight supported by the chassis on the opposite side of the chassis from where the base end is mounted.

8. The heavy duty brush cutter of claim 1, further comprising wheels mounted to the rear axle and driven by the rear drive shaft.

9. The heavy duty brush cutter of claim 8, further comprising a telescoping tree limb cutter comprising:

a cutting head supported by an outward end of a telescoping boom, the telescoping boom having a base end mounted to the chassis and configured to be rotatable in the horizontal plane from a parallel position to a perpendicular position with respect to the chassis, wherein the telescoping boom is configured to be raised and lowered.

10. The heavy duty brush cutter of claim 9, further comprising a counter-weight supported by the chassis on the opposite side of the chassis from where the base end is mounted.

11. The heavy duty brush cutter of claim 1, further comprising a central rotating blade driven by the gear box.

12. The heavy duty brush cutter of claim 11, further comprising a telescoping tree limb cutter comprising:

a cutting head supported by an outward end of a telescoping boom, the telescoping boom having a base end mounted to the chassis and configured to be rotatable in the horizontal plane from a parallel position to a perpendicular position with respect to the chassis, wherein the telescoping boom is configured to be raised and lowered.

13. The heavy duty brush cutter of claim 12, wherein the central blade is configured to cut softwood trees having a diameter of up to about 5".

14. The heavy duty brush cutter of claim 12, wherein the central blade is up to about 7' in diameter.

15. The heavy duty brush cutter of claim 12, further comprising a counter-weight supported by the chassis on the opposite side of the chassis from where the base end is mounted.

* * * * *